(12) United States Patent
Jeon et al.

(10) Patent No.: US 9,266,555 B2
(45) Date of Patent: Feb. 23, 2016

(54) ELECTRIC POWER STEERING APPARATUS OF BALL SCREW TYPE

(71) Applicant: MANDO CORPORATION, Pyeongtaek-si, Gyeonggi-do (KR)

(72) Inventors: In Hwan Jeon, Seongnam-si (KR); Hong Yong Bhae, Yongin-si (KR)

(73) Assignee: MANDO CORPORATION, Pyeongtaek-Si (SK)

(*) Notice: Subject to any disclaimer, the term of this patent is extended or adjusted under 35 U.S.C. 154(b) by 131 days.

(21) Appl. No.: 14/184,018

(22) Filed: Feb. 19, 2014

(65) Prior Publication Data

US 2014/0238166 A1 Aug. 28, 2014

(30) Foreign Application Priority Data

Feb. 28, 2013 (KR) ........................ 10-2013-0022027
Mar. 15, 2013 (KR) ........................ 10-2013-0027655

(51) Int. Cl.
| | |
|---|---|
| *F16H 3/06* | (2006.01) |
| *F16H 27/02* | (2006.01) |
| *F16H 29/02* | (2006.01) |
| *F16H 29/20* | (2006.01) |
| *B62D 3/08* | (2006.01) |
| *B62D 5/04* | (2006.01) |
| *F16H 25/22* | (2006.01) |
| *F16H 25/24* | (2006.01) |

(52) U.S. Cl.
CPC .. *B62D 3/08* (2013.01); *B62D 5/04* (2013.01); *B62D 5/0448* (2013.01); *F16H 25/2204* (2013.01); *F16H 2025/2445* (2013.01); *Y10T 74/18576* (2015.01)

(58) Field of Classification Search
CPC .............. B62D 3/08; F16H 2025/2445; F16H 25/2204
USPC ................................ 74/89.44, 424.86, 424.87
See application file for complete search history.

(56) References Cited

U.S. PATENT DOCUMENTS

| 5,749,266 A * | 5/1998 | Tsukada ............. F16C 29/0642 384/13 |
|---|---|---|
| 5,988,007 A * | 11/1999 | Nishimura .......... F16H 25/2219 74/424.87 |
| 6,941,831 B2 * | 9/2005 | Ohkubo .............. F16H 25/2219 74/424.86 |
| 2005/0076733 A1 * | 4/2005 | Yamamoto ........... B62D 5/0448 74/424.87 |
| 2007/0240532 A1 * | 10/2007 | Osterlanger ........ F16H 25/2223 74/424.87 |
| 2011/0296939 A1 * | 12/2011 | Kaneko ............... F16H 25/2214 74/424.87 |

FOREIGN PATENT DOCUMENTS

| JP | 11011334 A | 1/1999 |
|---|---|---|
| KR | 1020040051812 A | 6/2004 |

* cited by examiner

*Primary Examiner* — William Kelleher
*Assistant Examiner* — Jake Cook
(74) *Attorney, Agent, or Firm* — Hauptman & Ham, LLP

(57) ABSTRACT

A rack-driven auxiliary power steering apparatus prevents a ball nut and a nut pulley from idling due to a slip thereof and increases durability when the drive belt is operated by driving of a motor, and minimizes vibrations and noise transferred through the rack bar, the ball nut, and the nut pulley when the rack bar is slid while the nut pulley and the ball nut are rotating, thereby providing a comfortable steering feeling to the driver.

8 Claims, 10 Drawing Sheets

ELECTRIC POWER STEERING APPARATUS OF BALL SCREW TYPE

CROSS-REFERENCE TO RELATED APPLICATION

This application claims priority from and the benefit under 35 U.S.C. §119(a) of Korean Patent Application No. 10-2013-0022027, filed on Feb. 28, 2013, and Korean Patent Application No. 10-2013-0027655, filed on Mar. 15, 2013, which is hereby incorporated by reference for all purposes as if fully set forth herein.

BACKGROUND OF THE INVENTION

1. Field of the Invention

The present invention relates to an electric power steering apparatus of the ball screw type, and more particularly to an electric power steering apparatus of the ball screw type which prevents the load from being concentrated on the ball located at the outermost of the ball nut within the inner peripheral screw groove with the ball nut bended, thereby preventing the durability of the ball nut and the ball from being deteriorated.

2. Description of the Prior Art

A general electric power steering apparatus includes a steering system extending from a steering wheel to two wheels, and an auxiliary power mechanism for supplying auxiliary steering power to the steering system.

The auxiliary power mechanism includes a torque sensor for detecting a steering torque applied to a steering wheel by the driver and outputting an electric signal proportional to the detected steering torque, an electronic control unit (ECU) for generating a control signal based on the electric signal transferred from the torque sensor, a motor for generating auxiliary steering power based on the control signal transferred from the electronic control unit, and a belt type power transmission unit for transmitting auxiliary power generated by the motor to a rack bar via a belt.

An electric power steering apparatus of a ball screw type as the auxiliary power mechanism may include a return tube type, a deflector type, an end cap type and so on.

Figure 1:
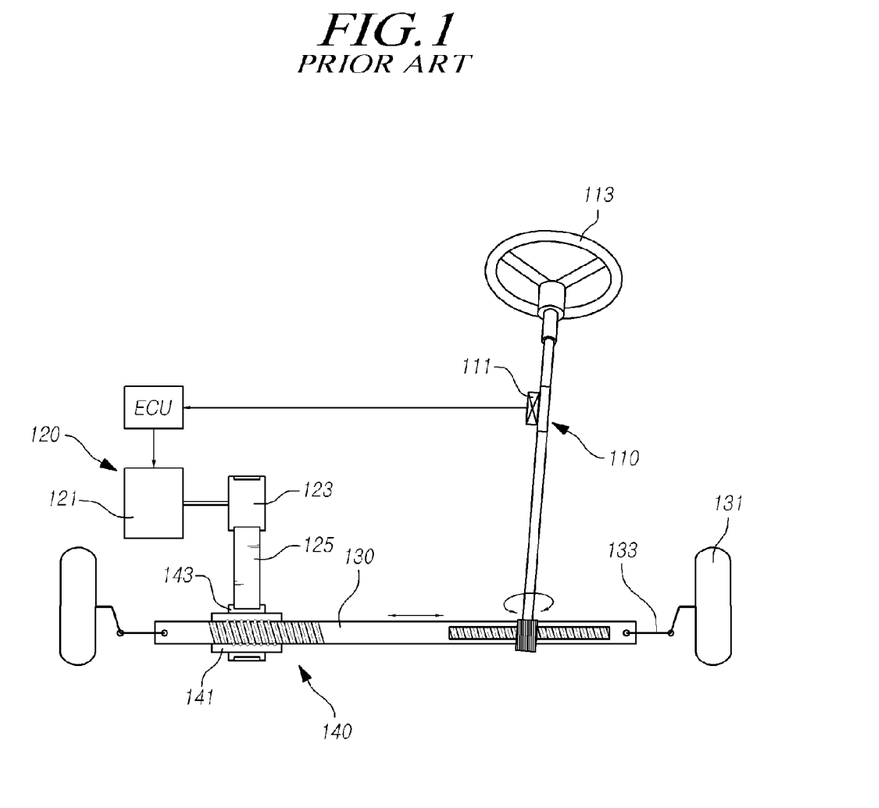
FIG. 1 is a sectional view schematically illustrating the electric power steering apparatus of the ball screw type according to the related art.
Figure 2:
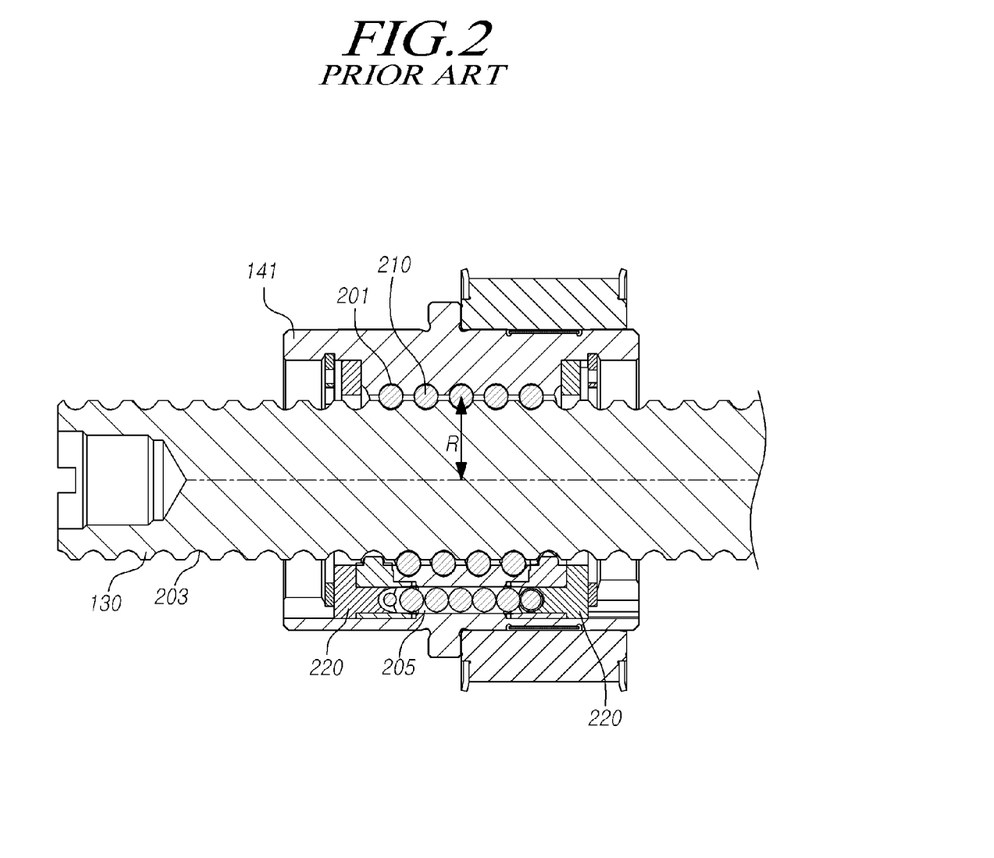
FIG. 2 is a sectional view schematically illustrating a portion of the electric power steering apparatus of the ball screw type according to the related art.

FIG. 1 is a sectional view schematically illustrating the electric power steering apparatus of the ball screw type according to the related art, and FIG. 2 is a sectional view schematically illustrating a portion of the electric power steering apparatus of the ball screw type according to the related art.

As illustrated in the drawings, the rack-driven auxiliary power steering apparatus according to the related art includes a driving unit 120 for generating a power to be controlled by an electronic control unit (ECU) which determines the degree of the steering of a steering wheel 113 by a torque sensor 111 mounted to a top end of a steering column 110, a rack bar 130 for making a tie rod 133 connected to a wheel moved according to the degree of the steering of the steering wheel 113, and a driven unit 140 for transforming the receiving rotating force of the driving unit 120 to an axially moving force and then transmitting it to the rack bar 130.

Here, the driving unit 120 includes an electric motor 121 controlled by an electronic control unit (ECU), a driving pulley 123 coupled to a shaft of the electric motor 121, and a drive belt 125 wound on a driving pulley 123.

The driven unit 140 also includes the ball nut 141 supporting the rack bar 130 within a rack housing surrounding the rack bar 130, and the driven pulley 143 coupled to an outer peripheral surface of the ball nut 141.

The driving pulley 123 connected to the shaft of the electric motor 121 and the driven pulley 143 connected to the ball nut 141 are disposed parallel to each other, the driving belt 125 is mounted on the driving pulley 123 and the driven pulley 143 to transmit a rotating force of the electric motor 121 to the rack bar 130, and the rack bar 130 is moved leftward and rightward by an operation of the ball nut 141 to generate an auxiliary steering force.

An inner peripheral screw groove 201 having a gothic arc-shaped cross-section is spirally formed on an inner peripheral surface of the ball nut 141, an outer peripheral screw groove 203 having a gothic arc-shaped cross-section is spirally formed on an outer peripheral surface of the rack bar 130, a ball is inserted between the inner peripheral screw groove 201 and the outer peripheral screw groove 203. While contacting the inner peripheral screw groove 201 and the outer peripheral screw groove 203, the ball 210 moves along the inner peripheral screw groove 201 and the outer peripheral screw groove 203, rolls from one side to the opposite side, and circulates through the ball circulation passage 205 formed between the end cap 220 and the ball nut 141 coupled to two sides of the inner peripheral surface of the ball nut 141 respectively.

In the rack-driven auxiliary power steering apparatus according to the related art, as there is generally equally formed a center radius of the ball (R, i.e., distance from the axis of the ball nut to a center of the ball) moving along the inner peripheral screw groove 201, the load is concentrated on the ball located at the outermost of the ball nut with the longitudinal direction within the inner peripheral screw groove with the ball nut bended, thereby causing the durability of the ball nut and the ball to be deteriorated.

Further, there is a step between the inner peripheral screw groove and an inlet of the end cap (i.e., part where the ball escapes the inner peripheral screw groove and enters the end cap) at a location where they meet with each other, thereby causing noise and vibrations to be generated as soon as the ball moving along the inner peripheral screw groove from one side to the opposite side enters the inlet of the end cap.

SUMMARY OF THE INVENTION

Accordingly, the present invention has been made to solve the above-mentioned problems occurring in the prior art, and an object of the present invention is to provide a electric power steering apparatus of the ball screw type which prevents the load from being concentrated on the ball located at the outermost of the ball nut within the inner peripheral screw groove with the ball nut bended, thereby preventing the durability of the ball nut and the ball from being deteriorated.

In order to accomplish this object, there is provided an electric power steering apparatus of a ball screw type comprising: a rack bar having a spiral outer peripheral screw groove on an outer peripheral surface thereof; a ball nut coupled to a rack bar via a ball and having a spiral inner peripheral screw groove corresponding to the outer peripheral screw groove on an outer peripheral surface thereof and a ball circulation passage axially penetrating between the inner peripheral screw groove and the outer peripheral screw groove; and an end cap coupled to two inner peripheral surfaces of the ball nut respectively and having a ball moving passage wherein one side thereof passes through the ball circulation passage and the other side thereof passes through the outer peripheral screw groove and the inner peripheral screw groove, wherein a center radius of the ball of the inner peripheral screw groove gradually increases toward an inlet of the ball moving passage and a distance from a central axis to an outermost of the inner peripheral screw groove gradually increases from the center of the ball nut to two sides thereof.

The electric power steering apparatus of the ball screw type according to an embodiment of the present invention prevents the load from being concentrated on the ball located at the outermost of the ball nut within the inner peripheral screw groove with the ball nut bended, thereby preventing the durability of the ball and the ball nut from being deteriorated.

Further, the electric power steering apparatus of the ball screw type according to an embodiment of the present invention connects the inner peripheral screw groove of the ball nut and an inlet of the end cap without the step, which prevents the moving passage of the ball circulating within the ball nut from being suddenly changed, thereby reducing the generation of noise and vibrations.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, exemplary embodiments of the present invention will be described with reference to the accompanying drawings. In the following description, it should be noted that if it is described in the specification that one component is "connected," "coupled" or "joined" to another component, a third component may be "connected," "coupled," and "joined" between the first and second components, although the first component may be directly connected, coupled or joined to the second component.

Figure 3:
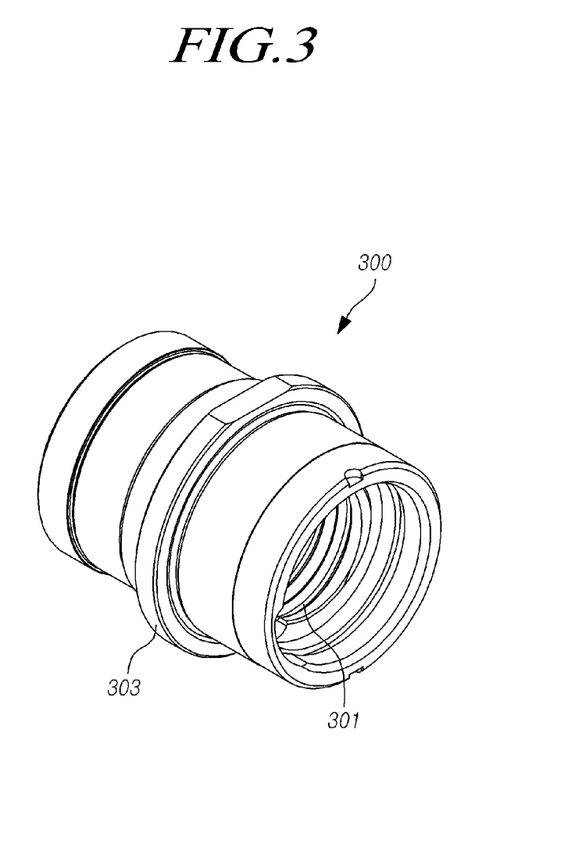
FIG. 3 is a perspective view illustrating of a ball nut according to an embodiment of the present invention.
Figure 4:
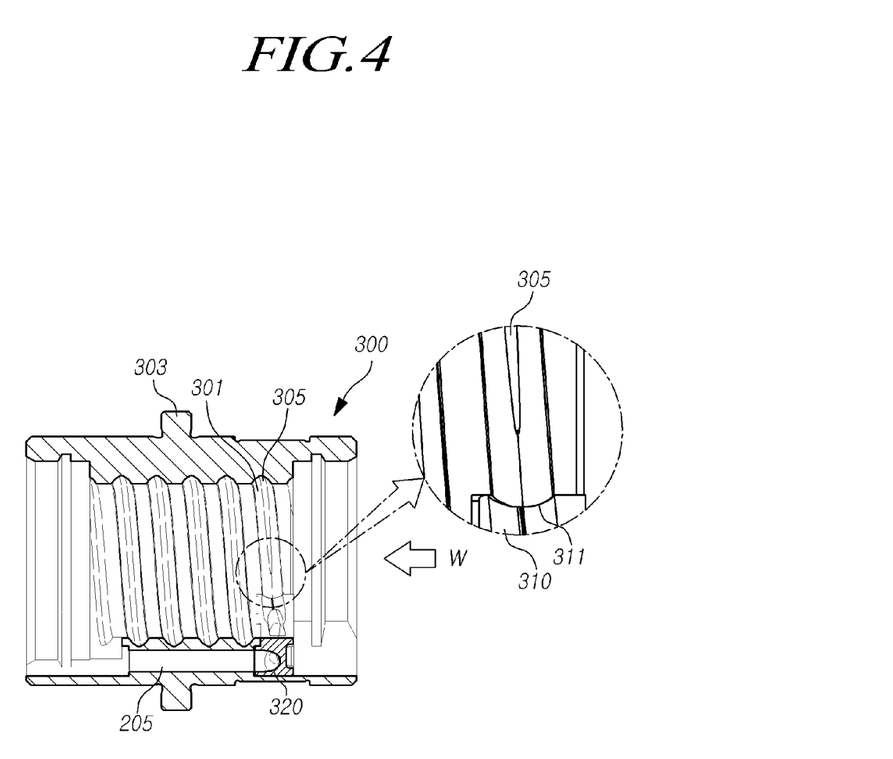
FIG. 4 is a sectional view and a partially exploded view of FIG. 3.
Figure 5:
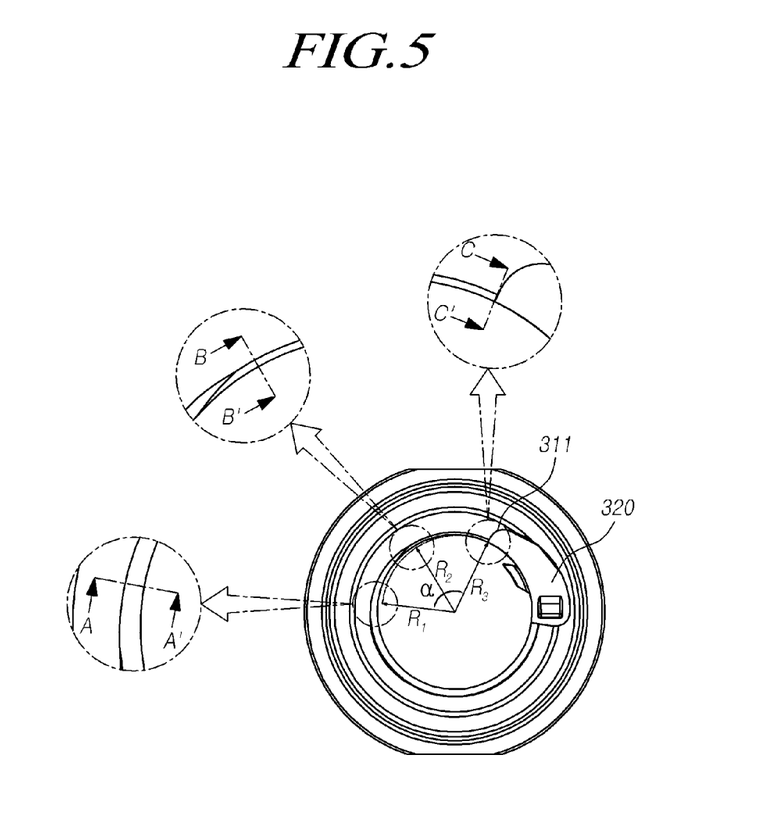
FIG. 5 is a drawing viewing the ball nut of FIG. 4 in the W direction.
Figure 6:
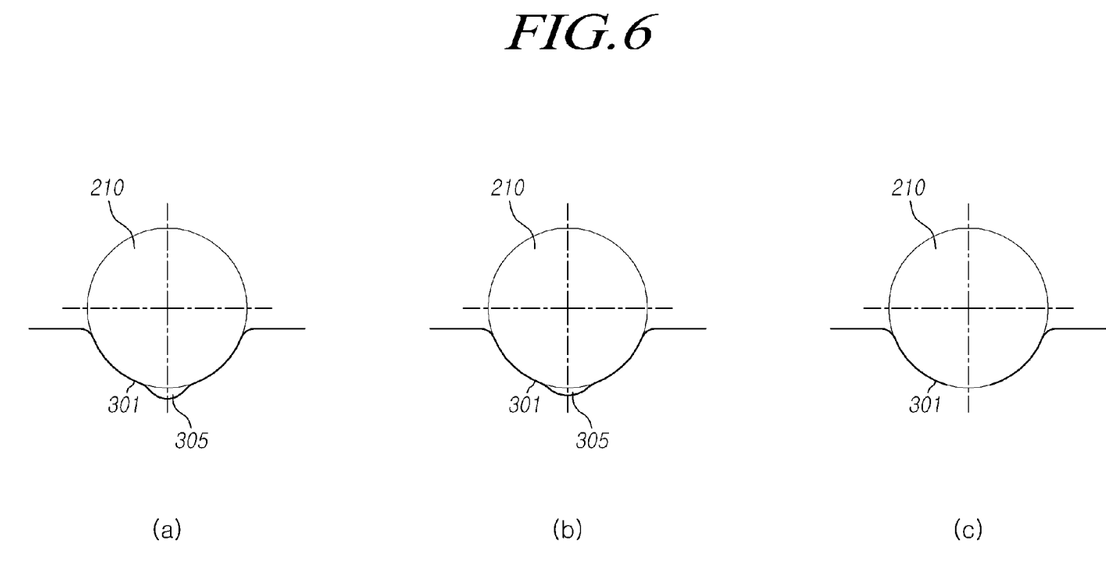
FIG. 6 is a sectional view according to A-A', B-B', C-C' lines of FIG. 5.
Figure 7:
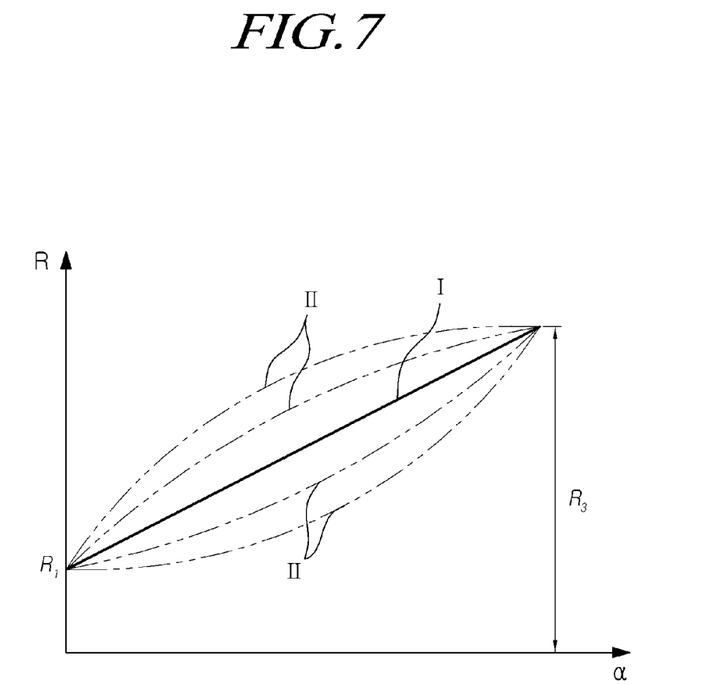
FIG. 7 is a graph illustrating an exemplary embodiment of a radius of the inner peripheral screw groove of the ball nut.
Figure 8:
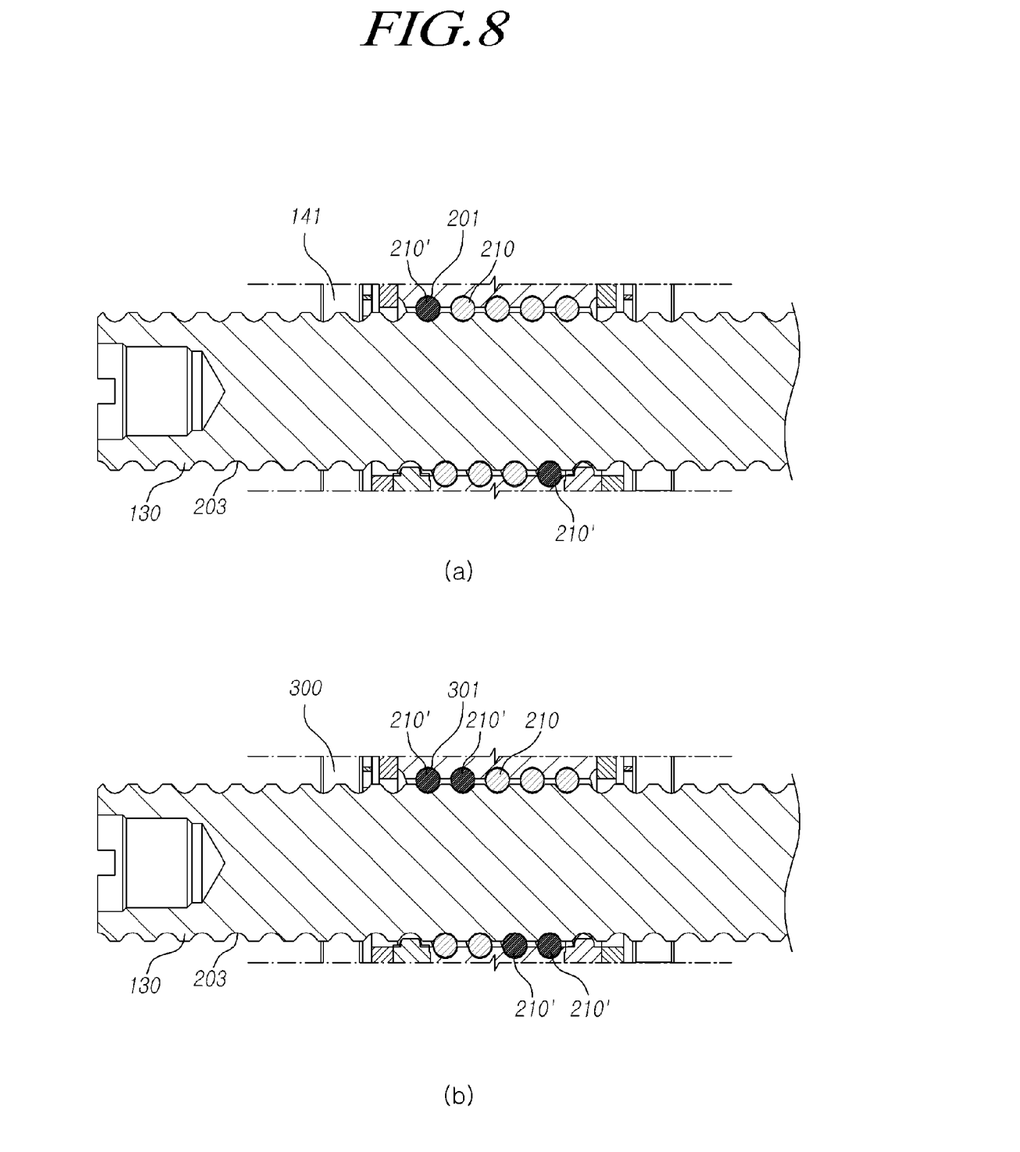
FIG. 8 is a drawing compared the loads applied to balls in the ball nuts according to the related art to an embodiment of the present invention respectively.
Figure 9:
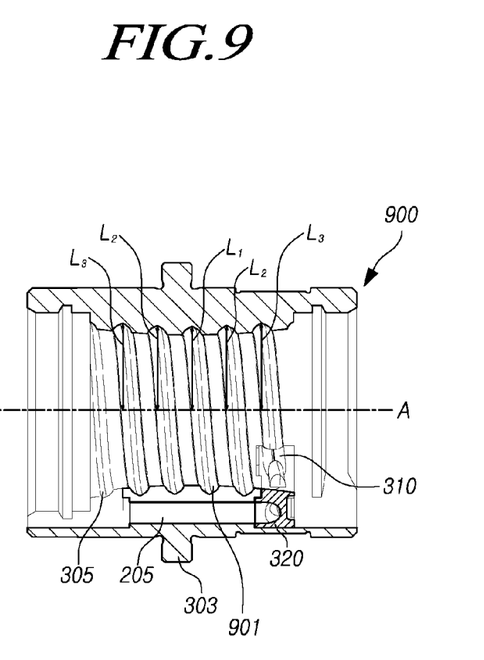
FIG. 9 is a sectional view of the ball nut according to the other embodiment of the present invention.
Figure 10:
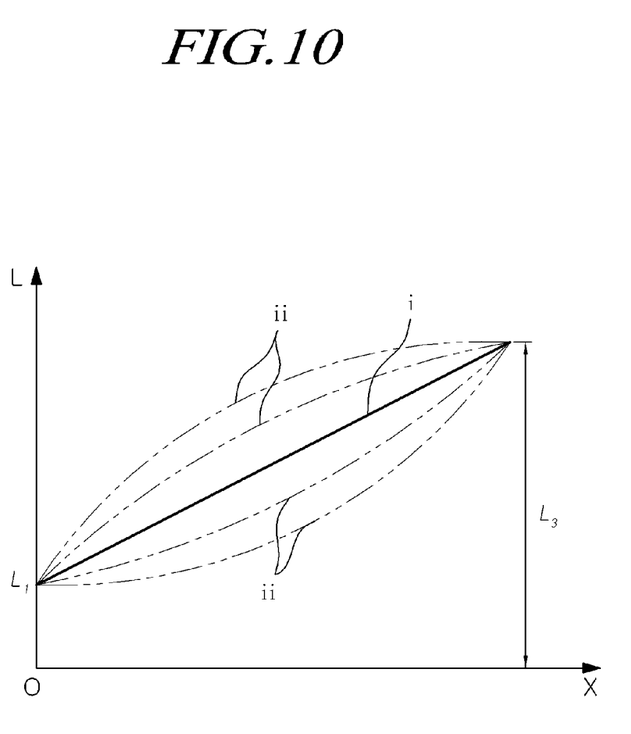
FIG. 10 is a graph illustrating an exemplary embodiment of a distance from a central axis of the ball nut to an outermost of the inner peripheral screw groove.

FIG. 3 is a perspective view illustrating of a ball nut according to an embodiment of the present invention. FIG. 4 is a sectional view and a partially exploded view of FIG. 3. FIG. 5 is a drawing viewing the ball nut of FIG. 4 in the W direction. FIG. 6 is a sectional view according to A-A', B-B', C-C' lines of FIG. 5. FIG. 7 is a graph illustrating an exemplary embodiment of a radius of the inner peripheral screw groove of the ball nut. FIG. 8 is a drawing compared the loads applied to balls in the ball nuts according to the related art and an embodiment of the present invention respectively. FIG. 9 is a sectional view of the ball nut according to the other embodiment of the present invention. FIG. 10 is a graph illustrating an exemplary embodiment of a distance from a central axis of the ball nut to an outermost of the inner peripheral screw groove.

As illustrated in the drawings, the electric power steering apparatus of the ball screw type according to the present invention includes a rack bar 130 having a spiral outer peripheral screw groove 203 on an outer peripheral surface thereof, a ball nut 300 coupled to a rack bar 130 via a ball 210 and having a spiral inner peripheral screw groove 301 corresponding to the outer peripheral screw groove 203 on an outer peripheral surface thereof and a ball circulation passage 205 axially penetrating between the inner peripheral screw groove 301 and the outer peripheral screw groove 203 and an end cap 320 coupled to two inner peripheral surfaces of the ball nut 300 respectively and having a ball moving passage 310 wherein one side thereof contacts the ball circulation passage 205 and the other side thereof contacts the outer peripheral screw groove 203 and the inner peripheral screw groove 301 wherein a center radius (R1,R2,R3) of the ball of the inner peripheral screw groove 301 gradually increases toward an inlet of the ball moving passage 310.

For convenience of explanation, FIG. 4 illustrates what the end cap 320 is provided only on one side of the ball nut 300.

The rack bar 130 coupled to a tie rod 133 coupled to a wheel 131 in FIG. 1. The rack bar 130 receives a rotating force generated by a rotation of the steering wheel 113 with a driver to linearly move and steers the wheel 131.

A spiral outer peripheral screw groove 203 is formed in some parts of an outer peripheral surface of the rack bar 130 and a cross section of the outer peripheral screw groove 203 is gothic arc-shaped.

The ball nut 300 is coupled to the rack bar 130 via the ball 210, the spiral inner peripheral screw groove 301 corresponding to the outer peripheral screw groove 203 is formed on an inner peripheral surface thereof, and the cross section of the inner peripheral screw groove 301 is also gothic arc-shaped.

There is formed a projection part 303 which is projected radial outwards on an central end of the outer peripheral surface of the ball nut 300, one side of the outer peripheral surface of the ball nut 300 is coupled to a bearing (not illustrated) supporting the ball nut 300 and the other side thereof is coupled to the driving pulley 123. The driving pully 123 is coupled to the shaft of the electric motor 121 in FIG. 1. The driven pulley 143 and the driving pully 123 is coupled with driving belt 125.

The ball circulation passage 205 is formed on the ball nut (300) axially penetrating between the inner peripheral screw groove and the outer peripheral screw groove. One side and the other side of the ball circulation passage 205 are connected to the end cap 320 respectively.

A groove 305 with a hollow shape outwards which contains a lubricant is formed on the inner peripheral screw groove 301. A radial cross-sectional area of the groove 305 gradually decreases toward the inlet of the ball moving passage 310 so that the groove 305 is not formed near the inlet 311 of the ball moving passage 310 of the end cap 320.

Further a center radius of the ball R3 of the inner peripheral screw groove 301 and a center radius of the ball of the ball moving passage 310 of the end cap 320 is equal to each other at a location where the inner peripheral screw groove 301 and an inlet 311 of the ball moving passage 310 of the end cap 320 meet with each other.

Because the radial cross-sectional area of the groove 305 formed on the inner peripheral screw groove 301 gradually decreases toward the inlet of the ball moving passage 310 of the end cap 320 so that the groove 305 is not formed near the inlet 311 of the ball moving passage 310 of the end cap 320, the inner peripheral screw groove 301 and the inlet 311 of the ball moving passage 310 is connected to each other without the step.

Therefore, there is solved the problem that a step between the inner peripheral screw groove and an inlet of the end cap at the location where they meet with each other causes noise and vibrations to be generated as soon as the ball moving along the inner peripheral screw groove from one side to the opposite side enters the inlet of the end cap.

Meanwhile the center radius (R1,R2,R3) of the ball of the inner peripheral screw groove 301 to the direction of the inlet 311 of the ball moving passage 310 gradually increases toward the inlet 311 of the ball moving passage 310.

While the center radius of the ball at the section of the inner peripheral screw groove 301 without some distance from the inlet 311 of the ball moving passage 310 of the end cap 320 is generally equal to R1 according to the related art, the center radius of the ball at the section of the inner peripheral screw groove 301 with some distance from gradually increases such as R1<R2<R3 according to the embodiment as described above.

The section where the center radius of the ball of the inner peripheral screw groove gradually increases may be equal to the section of angle α° with 15° to 70°.

What the center radius of the ball of the inner peripheral screw groove 301 to the direction of the inlet 311 of the ball moving passage 310 gradually increases toward the inlet 311 of the ball moving passage 310 can prevent the load from being concentrated on the ball located within the inner peripheral screw groove 301 at the longitudinal outermost of the ball nut 300 with the ball nut 300 bended.

In other words, while the center radius of the ball is generally equal in case of the ball nut 141 according to the related art referring to FIG. 8(a) so that the load is concentrated on the ball 210' within the inner peripheral screw groove 201 at the longitudinal outermost of the ball nut 141 with the ball nut 141 bended, thereby causing the durability of the ball 201' and the ball nut 141 to be deteriorated.

However in case of the ball nut 300 according to the embodiment of the present, referring to FIG. 4, FIG. 5 and FIG. 8(b), the center radius of the ball of the inner peripheral screw groove 301 to the direction of the inlet 311 of the ball moving passage 310 gradually increases toward the inlet 311 of the ball moving passage 310 so that predetermined space can be formed between the ball 210' located within the inner peripheral screw groove 301 at the longitudinal outermost of the ball nut 300. Therefore the load is not concentrated on only the ball 210' located within the inner peripheral screw groove 301 at the longitudinal outermost of the ball nut 300 with the ball nut 300 bended but distributed on the ball 210' within the inner peripheral screw groove 301 near the longitudinal outermost inner peripheral screw groove 301, thereby preventing the durability of the ball 201' and the ball nut 300 from being deteriorated.

Further, a center radius of the ball of the inner peripheral screw groove 301 may linearly (I) or non linearly (II) gradually increase to an inlet 311 of the ball moving passage 301 of the end cap 320.

Referring to FIG. 9, an electric power steering apparatus of a ball screw type according to the other embodiment of the present invention includes a rack bar 130 having a spiral outer peripheral screw groove 203 on an outer peripheral surface thereof, a ball nut 900 coupled to a rack bar 130 via a ball 310 and having a spiral inner peripheral screw groove 901 corresponding to the outer peripheral screw groove 203 on an outer peripheral surface thereof and a ball circulation passage 205 axially penetrating between the inner and the outer peripheral surfaces, and an end cap 320 coupled to two inner peripheral surfaces of the ball nut 900 respectively and having a ball moving passage 310 wherein one side thereof passes through the ball circulation passage 205 and the other side thereof passes through the outer peripheral screw groove 203 and the inner peripheral screw groove 901. According to the other embodiment of the present invention the inner peripheral screw groove 901 of the ball nut 900 is that a distance L from a central axis (A) to an outermost thereof may gradually increases from the center (o) of the ball nut 900 to two sides thereof.

When the distance L1, L2 and L3 from the central axis (A) of the ball nut 900 to the outermost of the inner peripheral screw groove 901 gradually increases from the center (o) of the ball nut 900 to two sides thereof, the distance from the central axis (A) to the outermost of the inner peripheral screw groove 901 linearly (i) or nonlinearly (ii) gradually increases according to the distance (X) from the center (o) of the ball nut 900 to two sides thereof to the direction of axis.

If the distance L1, L2 and L3 from the central axis (A) of the ball nut 900 to the outermost of the inner peripheral screw groove 901 gradually increases from the center (o) of the ball nut to two sides thereof, a space formed between the inner peripheral screw groove 901 of the ball nut 900 and the outer peripheral screw groove 203 of the rack bar 130 gradually increases from the center part of the ball nut 900 to two sides thereof.

What the distance L1, L2 and L3 from the central axis (A) of the ball nut 900 to the outermost of the inner peripheral screw groove 901 gradually increases from the center (o) of the ball nut to two sides thereof may prevent the load from being concentrated on the ball 210' within the outermost inner peripheral screw groove 901 with the longitude direction of the ball nut 900 because of an effect on a backlash when the ball nut 900 is bended derived from the deflection or bending with a outer force transmitted to the rack bar 130, thereby causing the durability of the ball 210' and the ball nut 900 to be enhanced.

In other words, as the distance L from the central axis (A) of the ball nut 900 to the outermost of the inner peripheral screw groove 901 gradually increases from the center (o) of the ball nut 900 to two sides thereof, so does a space between the inner peripheral screw groove 901 of the ball nut 900 and the outer peripheral screw groove 203 of the rack bar 130. Therefore there exists a lot of spare space where the ball 210 can move with the radial direction, which makes the load distributed on the ball 201' within the inner peripheral screw groove 901 near the ball 210' within the outermost thereof to the longitude direction of the ball nut 900, thereby causing the durability of the ball 210' and the ball nut 900 to be enhanced.

Further there exists a lot of spare space where the ball 210 can move between the inner peripheral screw groove 901 of the ball nut 900 and the outer peripheral screw groove 203 of the rack bar 130, thereby capable of solving the problem that frictional forces of the ball 210' from one side to the opposite side become not uniform although there changes alignment position where the ball nut 900 is coupled to the rack bar 130.

Of course an electric power steering apparatus of a ball screw type 901 according to the other embodiment of the present invention is that the inner peripheral screw groove 901 has a groove 305 with a hollow shape outwards which contains a lubricant. The outwards may mean the radial outer side of the ball nut 900.

The groove 305 as described above is formed along the inner peripheral screw groove 901 on the lowest part of the inner peripheral screw groove 901 which is the farthest from the central axis (A) therein.

This embodiment of the present invention may prevent the load from being concentrated on the ball within the outermost inner peripheral screw groove of the ball nut with the ball nut bended, thereby preventing the durability of the ball and the ball nut to be deteriorated.

Further the inner peripheral screw groove and the inlet of the ball moving passage of the end cap is couple to each without the step, thereby preventing the moving passage of the ball circulating within the ball nut from suddenly changing to reduce the noise and vibrations.

Further although alignment position where the ball nut 900 is coupled to the rack bar 130 changes, this embodiment of the present invention can prevent frictional forces of the ball 210' from one side to the opposite side from being not uniform.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units.

In addition, since terms, such as "including," "comprising," and "having" mean that one or more corresponding components may exist unless they are specifically described to the contrary, it shall be construed that one or more other components can be included. All of the terminologies containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. An electric power steering apparatus of a ball screw type, the electric power steering apparatus comprising:
    a rack bar having a spiral outer peripheral screw groove on an outer peripheral surface of the rack bar;
    a ball nut coupled to the rack bar via a ball and having
        an inner screw groove on an inner surface of the ball nut, corresponding to the spiral outer screw groove and
        a ball circulation passage axially penetrating between the inner screw groove and an outer surface of the ball nut; and
    an end cap coupled to the inner surface of the ball nut and having a ball moving passage,
    wherein one side of the ball moving passage passes through the ball circulation passage and other side of the ball moving passage passes through the spiral outer peripheral screw groove and the inner screw groove,
    wherein a first distance from a central axis of the ball nut to an outermost of the inner screw groove gradually increases from a center of the ball nut to two end sides of the ball nut,
    wherein the inner screw groove has a hollow shaped groove which contains a lubricant, and
    wherein a radial cross-sectional area of the hollow shaped groove formed in a section where a second distance from the central axis of the ball nut to the center of ball on the inner screw groove gradually increases, gradually decreases toward an inlet of the ball moving passage.

2. The electric power steering apparatus of the ball screw type in claim 1, wherein
    the first distance from the central axis to the outermost of the inner peripheral screw groove-linearly gradually increases from the center of the ball nut to two end sides of the ball nut.

3. The electric power steering apparatus of the ball screw type in claim 1, wherein the first distance from the central axis to the outermost of the inner peripheral screw groove nonlinearly gradually increases from the center of the ball nut to two end sides of the ball nut.

4. An electric power steering apparatus of a ball screw type, the electric power steering apparatus comprising:
    a rack bar having a spiral outer peripheral screw groove on an outer peripheral surface of the rack bar;
    a ball nut coupled to the rack bar via a ball and having
        an inner screw groove on an inner surface of the ball nut, corresponding to the spiral outer peripheral screw groove, and
        a ball circulation passage axially penetrating between the inner screw groove and an outer surface of the ball nut; and
    an end cap coupled to the inner surface of the ball nut and having a ball moving passage,
    wherein one side of the ball moving passage passes through the ball circulation passage and other side of the ball moving passage passes through the spiral outer peripheral screw groove and the inner screw groove,
    wherein a first distance from a central axis of the ball nut to the center of ball on the inner screw groove gradually increases toward an inlet of the ball moving passage,
    wherein the inner screw groove has a hollow shaped groove which contains a lubricant, and
    wherein a radial cross-sectional area of the hollow shaped groove in a section where the first distance gradually increases, gradually decreases toward the inlet of the ball moving passage.

5. The electric power steering apparatus of the ball screw type in claim 4, wherein the first distance and a second distance from the central axis of the ball nut to a center of the inlet are equal to each other at a location where the inner screw groove and an inlet of the end cap meet with each other.

6. The electric power steering apparatus of the ball screw type in claim 4, wherein a second distance from a central axis of the ball nut to an outermost of the inner screw groove gradually increases from a center of the ball nut to two end sides of the ball nut.

7. The electric power steering apparatus of the ball screw type in claim 6, wherein the second distance linearly gradually increases from the center of the ball nut to two end sides of the ball nut.

8. The electric power steering apparatus of the ball screw type in claim 6, wherein the second distance nonlinearly gradually increases from the center of the ball nut to two end sides of the ball nut.

* * * * *